United States Patent [19]
Kirk

[11] 3,892,659
[45] July 1, 1975

[54] MULTIPLE CYCLE PROCESS FOR WASTEWATER PURIFICATION

[75] Inventor: Bradley S. Kirk, Plainfield, N.J.

[73] Assignee: AIRCO, Inc., Montvale, N.J.

[22] Filed: May 4, 1973

[21] Appl. No.: 357,123

[52] U.S. Cl. ................... 210/3; 210/128; 210/195
[51] Int. Cl. ..................... C02b 3/08; C02c 1/08
[58] Field of Search ................. 210/3–9, 124, 210/125, 128, 129, 195, 257, 15, 194, 199, 201, 256

[56] References Cited
UNITED STATES PATENTS

| | | | |
|---|---|---|---|
| 2,419,492 | 4/1947 | Green | 210/5 |
| 2,436,584 | 2/1948 | Logan | 210/5 |
| 3,517,810 | 6/1970 | Beer | 210/5 X |
| 3,547,813 | 12/1970 | Robinson et al. | 210/7 |
| 3,563,382 | 2/1971 | Regent | 210/195 X |
| 3,607,735 | 9/1971 | Hover et al. | 210/7 |
| 3,679,053 | 7/1972 | Koulovatos et al. | 210/124 X |
| 3,772,187 | 11/1973 | Othmer | 210/7 |

*Primary Examiner*—Thomas G. Wyse
*Attorney, Agent, or Firm*—David L. Rae; H. Hume Mathews; Edmund W. Bopp

[57] ABSTRACT

A wastewater purification process wherein wastewater and activated sludge are mixed within a receiving well from which the mixture is withdrawn, then mixed with oxygen and directed through a series of contained reaction stages, the mixed liquor then being withdrawn and divided into two streams, one main stream being recycled directly to the receiving well and the other stream of lesser volume going to a clarifier from which activated sludge is recycled to the well.

14 Claims, 3 Drawing Figures

MULTIPLE CYCLE PROCESS FOR WASTEWATER PURIFICATION

BACKGROUND OF THE INVENTION

The urgent need for industrial and municipal wastewater treatment for lessening pollution of natural waters has become more pronounced within recent years due to large increases in both size of population centers and industrial activity. To meet this need, new methods of wastewater treatment have been proposed for accelerating the treatment rate. In one method, for example, commercially pure oxygen is injected along with wastewater and recycled activated sludge into a closed pipeline reactor for required detention, mixing and oxygenation as the mixed liquor moves through the pipeline. After desired BOD reduction, the mixed liquor from the reactor goes to a clarifier, from which activated sludge is recycled to the reactor inlet, and the clear effluent is drawn off for normal disinfection and discharge, or further purification, as desired. It has been further proposed to increase the amount of dissolved oxygen in the mixed liquor throughout a single-pass reactor for more effective and rapid reduction of BOD by injecting oxygen at spaced intervals along the reaction zone.

Notwithstanding material improvement over conventional methods of purifying wastewater by the activated sludge process, there are several undesirable constraints on the design and operation of the single-pass reactor method as applied to practical situations. The flow velocity through a pipeline for example, must at all times be great enough to provide mixing to keep the activated sludge in suspension, the minimum velocity being typically ½ to 1 ft/sec. The total volume of the pipeline, however, must be such that the period of detention, the pipe volume divided by the volumetric flow, must be sufficient for the biological purification process to reach the desired degree of completion: typically, this period is 1 to 3 hours.

In practical wastewater treatment plants, the rate of flow to and through the plant varies with time. The constraint on minimum flow velocity must be satisfied at minimum plant flow, and the constraint on minimum reactor time must be satisfied at maximum plant flow. The result is a relatively small diameter pipeline, possibly a mile or more in length. Moreover, the water pumping system necessary to propel the liquid through the pipeline must accommodate varying flow rates.

In addition, the limit on flow velocity imposed by practical lengths of pipe usually requires that static mixing devices be placed at intervals along the pipe to enhance the rate of oxygen dissolution. The spacing of these static mixing devices can be optimized only if the rate of oxygen consumption in the process is known and is constant. As a matter of fact, the rate of oxygen consumption varies with changes in both the influent flow and composition of the wastewater. Therefore, the number of static mixing devices and their spacing must satisfy the maximum anticipated oxygen up-take in each segment or reaction stage of the pipeline.

The present invention is concerned with removing or minimizing the constraints and disadvantages inherent in the single-pass pipeline reactor described above.

SUMMARY OF INVENTION

The system invention includes a mixing vessel or well that receives influent wastewater and activated sludge. The mixture is continuously withdrawn and mixed with oxygen as it goes successively through a plurality of contained reaction stages for predetermined detention and oxygenation of the mixed liquor. After detention and before clarification, the mixed liquor is divided into two streams, one of which goes to a clarifier, the other being recycled directly to the mixing vessel. The recycled stream which is subject to control for compensating significant variations in flow rate of incoming wastewater, is at least equal to the volume of the clarifier stream and may be greater, depending on the desired number of recycling passes of the mixed liquor through the detention-reaction stages. A generally continuous turbulence of the mixed liquor is induced during the reaction-detention period for optimizing the BOD reduction. Activated sludge from the clarifier is recycled to the mixing well and the clarifier effluent after disinfection is discharged for return to natural waters.

A principal object of the invention is an improved and economical multiple-pass wastewater treatment system using the activated sludge biological process, that is capable of increasing the effective reactor detention time as required for effective water purification without decreasing the correct flow velocity required for efficient mixing of the reacting liquid.

Another object of the invention is an improved oxygen transfer and biological reaction rate system that combines the high characteristic driving forces of the single-pass plug-flow type pipeline reactor with the greater biological stability associated with completely mixed continuous reactors.

Another and related object is an improved recycle or multiple pass wastewater treatment system of the character described above, wherein correct rate of flow of mixed liquor within the reactor for most efficient reaction can be maintained notwithstanding material variation in flow rate of the incoming wastewater.

Other objects, features and advantages will appear from the following description with reference to the accompanying drawings.

DESCRIPTION OF PREFERRED EMBODIMENT

Figure 1:
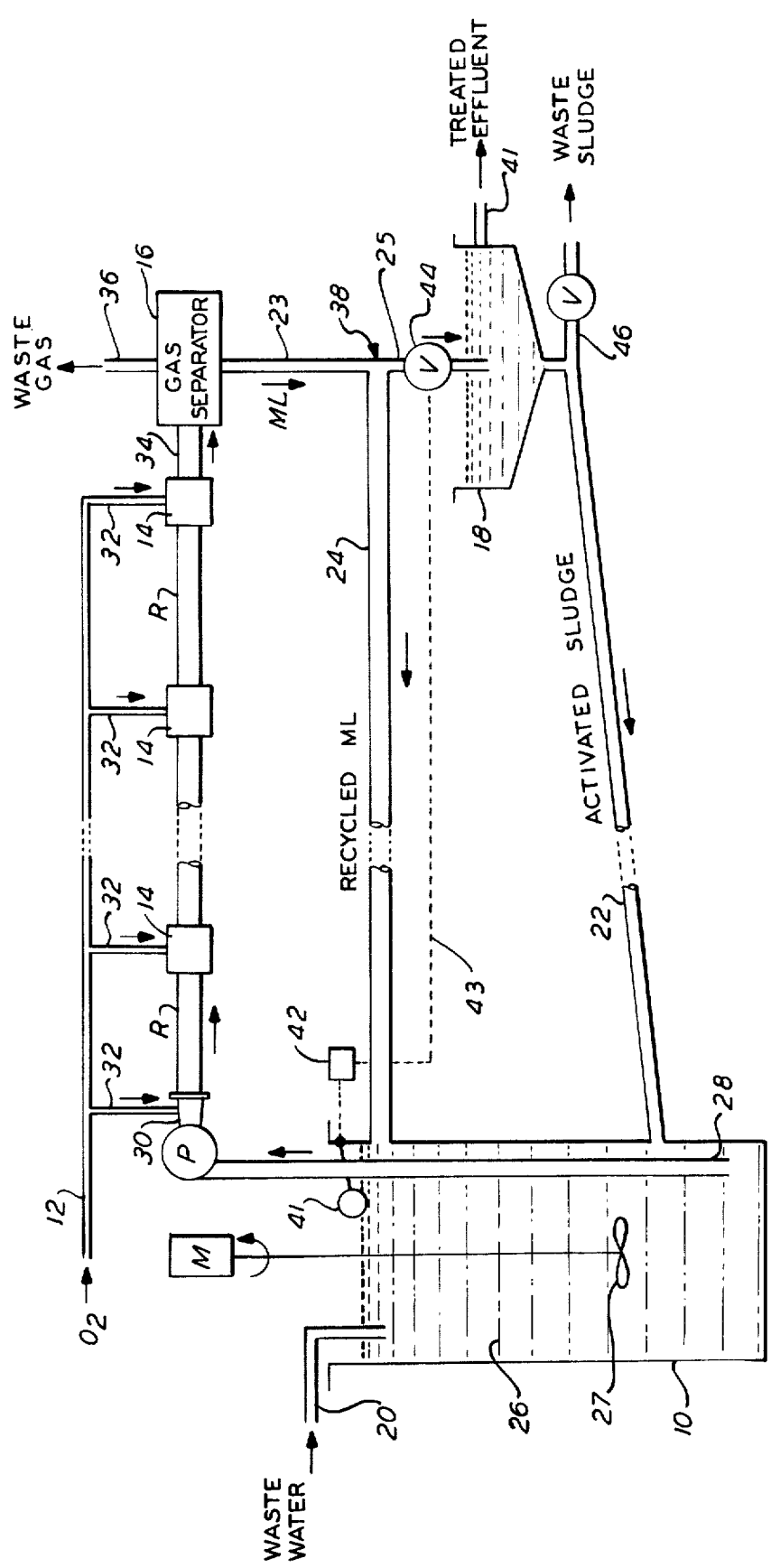
FIG. 1 is a schematic flow diagram illustrating one form of the invention as applied to a pipeline reactor.

The wastewater treatment system shown by FIG. 1 is in general of the "pipeline reactor" type mentioned above, wherein a mixture of incoming wastewater, recycled activated sludge and oxygen gas is pumped through the reactor. The reactor includes static mixing devices at spaced intervals for enhancing the reaction rate by improved contact between the oxygen gas and the liquid mixture and is suitable for plants where wastewater influent to the reactor is substantially constant. A pipeline reactor of this character is shown by U.S. Pat. No. 3,607,735, granted Sept. 21, 1971 to Hover et al, and assigned to the same assignee as the present invention.

Referring particularly to the invention of FIG. 1, the disclosed system comprises essentially a receiving well or receptacle 10 for the incoming wastewater, a pump P For drawing liquid from the well and directing it into a pipeline reactor R, an oxygen supply line 12 for injecting oxygen into static mixing devices 14 at spaced intervals or reaction stages along the pipeline, a gas separator 16 for venting waste and depleted gas from the reactor, and valve controlled conduit connections for dividing as required, flow of mixed liquor (ML) leaving the reactor into separate streams for respectively, feed to the clarifier 18 and receiving well 10. The recycled flow to the receiving well is regulated so as to maintain an approximately constant liquid level in the well coincident with substantially constant ML flow through the reactor.

The specific operation of the system is as follows: incoming wastewater from conduit 20 flows into the well 10, mixing with recycled activated sludge from the outlet sludge line 22 of the clarifier, and with recycled mixed liquor from the conduit 24 branching from the separator outlet conduit 25. The well mixture 26 of wastewater, recycled mixed liquor and activated sludge is drawn from the well by pump P through its intake line 28 and forced at 30 into the receiving end of the pipeline reactor R. Positive pump pressure ensures more or less turbulent flow of the mixed liquor throughout the length of the reactor as described below.

For ensuring adequate mixing of the various components entering the well prior to pumping, a mechanical stirring device is provided. This can take the form of a simple impeller 27 that is rotated as required by a motor M. The impeller also tends to prevent settling out of activated sludge in the well.

Figure 3:
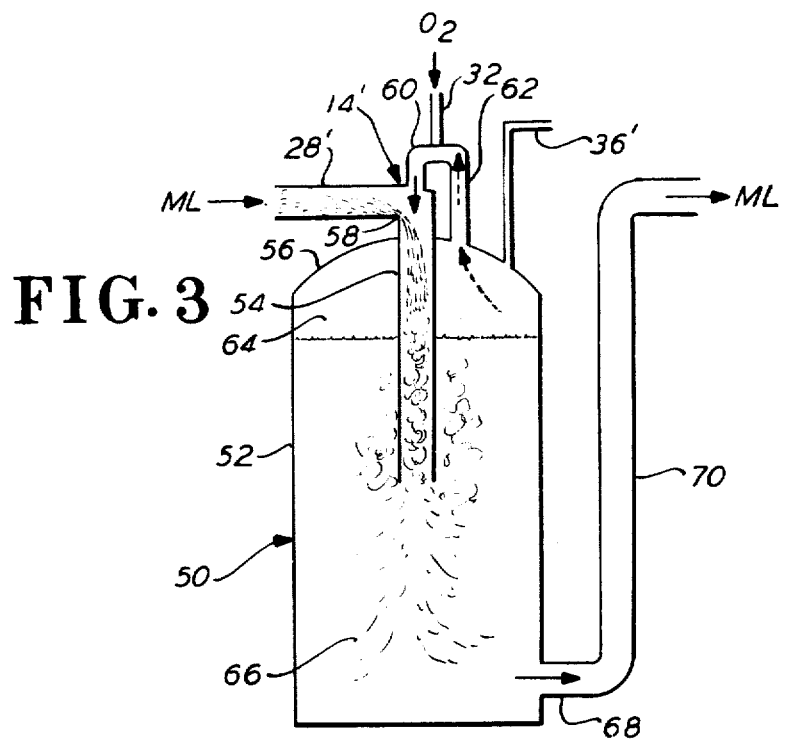
FIG. 3 is a detailed elevational view, partly broken away, of one of the reaction stage vessels of FIG. 2.

At the entrance of the reactor and at the spaced static mixing device 14, individual branch lines 32 from the main oxygen supply line 12 inject oxygen into the tubulent mixed liquor. Oxygen is injected in quantities sufficient to maintain the desired concentration of dissolved oxygen, at least 1 mg/liter average throughout the length of the reactor, thereby insuring the proper rate of aerobic reaction and decreasing total detention time. The static mixing devices 14, preferably embody the freefall principle that is generally illustrated in FIG. 3; this type of static mixing device is more fully described in U.S. Pat. No. 3,826,742 to Kirk et al and assigned to the same assignee as the present invention.

As the mixed liquor leaves the reactor proper at conduit 34, it passes through a gas separator 16 wherein the undissolved and depleted waste gas is separated from the mixed liquor and vented to atmosphere at 36. The mixed liquor then flows from the separator through conduit 23 which is branched at junction 38 for dividing the mixed liquor into two streams, namely a major stream through conduit 24 for recycling to the well 10, and a minor stream through conduit 25 to the clarifier 18. The branch conduit 25 is provided with a flow rate control valve 44 for dividing the mixed liquor flow according to desired recycling flow velocity. To this end, the valve 44 is actuated according to variation in liquid level of the receiving well 10. A suitable liquid level indicator, such as a float 41 is operatively connected to an actuator 42 that in turn, operates the valve 44 as required through a connection 43. Thus, the liquid level device 41 represents a desired reference level for the well that is maintained for practical purposes by control of the recycled mixed liquor flow described above. In practice, the valve 44 is in operation almost continuously for correcting variations from the well reference level by increasing or decreasing the recycling ML flow through conduit 24, as the case may be.

The recycle conduit 24 also inherently functions as a part of the pipeline reactor, depending upon its total volume for extending detention time. The activated sludge at the bottom of the clarifier is mainly recycled through conduit 22 to the well 10, the excess or waste sludge being drawn off for disposal at 46. The receiving well 10 wherein the wastewater, activated sludge and recycled mixed liquor are collected, also functions as a form of surge tank providing for material transient variations in the flow of incoming wastewater. For example, it will be assumed that a peak surge of incoming wastewater occurs tending to raise the well level significantly. The resulting actuation of the float control 41 causes full opening of branch valve 44 for increased flow to the clarifier. Thus, excess liquid is temporarily dumped or by-passed to the clarifier for preventing flooding of the well. During this abnormal transient condition, the ML flow rate through the reactor proper is maintained constant by the well pump, although the recycled ML in conduit 24 may be reduced well below the normal rate indicated above.

On the other hand, should the flow rate of incoming wastewater decrease significantly (or temporarily cease), so as to cause appreciable lowering of the well level, the ML flow to the clarifier could conceivably be shut off entirely by valve 44 during this transient condition. This situation represents the maximum ML recycling ratio between reactor and well. Throughout the complete range of recycling ratios described above, the ML flow rate through the reactor stages is maintained at its normal constant value.

From the description above it will be seen that the system of FIG. 1 is capable of multiple recycling of the mixed liquor directly to the receiving well prior to the clarifying operation for maintaining a desired rate of flow through the reactor while increasing as required the total detention time of the mixed liquor within the reactor itself. This form of the invention therefore, lends itself to comparatively large diameter pipelines of short length, not heretofore possible due to constraints of required flow rate and detention time factors. Furthermore, pipeline reactors of this character are considerably more economical than comparatively long pipelines of small diameter. That is, considering the pipe volume (in cubic feet) in relation to the installation costs for a given length of pipe reactor, the overall cost per cubic foot of a large diameter pipe reactor, is considerably less than that of a small diameter reactor.

Significant advantages of the mixed liquor recycle or multipass now become apparent, especially for the pipeline reactor described above. For a single pass with no recycle of mixed liquor, the pipe diameter is fixed by restraint on flow velocity which preferably should be at least one foot per second. In the multipass system, the desired velocity can be maintained in a large pipe by multiple recycling while providing adequate detention and treatment time. Thus, the correct velocity can be maintained in the pipeline for a known or calculated plant load, notwithstanding transient variations in plant influent flow, by adjusting the basic recycle ratio for the correct number of passes.

The multipass system using large diameter pipe ordinarily requires fewer static mixing devices. As the rate of oxygen dissolution in the mixed liquor is more nearly constant, the spacing of the static mixers also can be more readily determined. The economic advantage of the multipass system resides in the fact that the treatment time is proportional to the total volume of the pipeline; it therefore follows that the proposed comparatively short reactor of large diameter is less expensive than one of comparable volume wherein the pipeline is long and slender.

Figure 2:
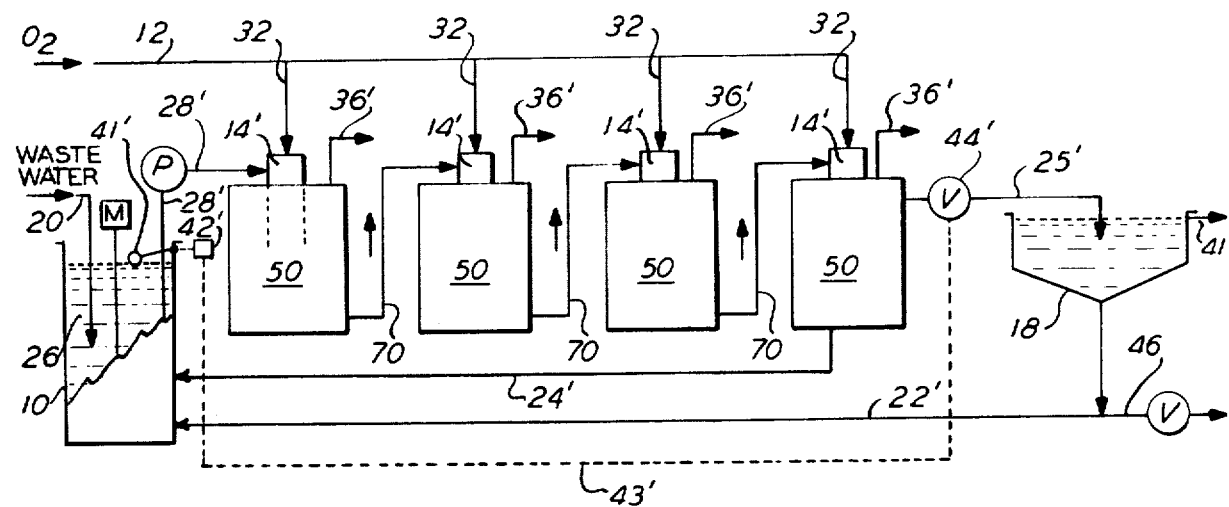
FIG. 2 is a similar illustration of another form of the invention as applied to series-connected contained reaction vessels.

The wastewater treatment system shown by FIG. 2 is of the completely mixed, continuous reactor type. As shown, the series reaction stages each comprise respectively, a separately contained vessel 50 and static mixing device 14' that functions basically like a corresponding stage of the pipeline reactor of FIG. 1, i.e. each stage including a static mixing device and the downstream reaction section to the next static mixer. As in the system of FIG. 1, a receiving well 10 collects the incoming wastewater, activated sludge and recycled mixed liquor as shown, the same reference numbers being used for corresponding conduits and supply lines. Inasmuch as the reactor container stages 50 are similar, it will be sufficient to describe the construction, operation and functioning of the first stage into which the well mixture is pumped through conduit 28'.

Referring now to FIG. 3, the reactor stage 50 comprises an enclosed tank 52 having an enlarged cylinder-like conduit 54 extending through the cover 56 into the tank a material distance below liquid level. This conduit which is connected to the pump conduit 28' through a right angle bend or L-joint 58, feeds the well mixture to the tank 52. The conduit 54 at the joint 58 also is connected to a U-shape pipe 60 having a re-entrant portion 62 that communicates with the tank space 64 above liquid level. The oxygen supply branch line 32 is connected to the U-pipe 60 as shown, for injecting oxygen into the free-falling mixed liquor passing downwardly through conduit 54. As diagrammatically shown, the liquid from conduit 28' changes from substantially solid flow to free-fall flow after passing the conduit bend at 58. As the liquid is broken up into spray and foam during its free-fall, oxygen injection at this stage is effective for causing thorough mixing of the oxygen bubbles and entrapping thereof in the falling liquid which is carried downwardly into the main body of the mixed liquor within the tank.

Thus the L-joint 58 connecting the conduits 28' and 54, the U-pipe 60 and source of pressurized oxygen, together constitute a static mixing device as stated above for bringing the oxygen gas and diffused liquid into desired interface contact for high rate dissolution of oxygen.

The mixture carrying with it the oxygen, both dissolved and undissolved, flows into the lower part of the tank where further dissolution of oxygen bubbles takes place as the mixed liquor circulates in the tank incident to inlet and outlet flow. Undissolved oxygen that collects in the tank dome space 64 is drawn upwardly into the re-entry portion 62 of the U-pipe by induction and recycled for re-use into the free-falling mixed liquor stream in conduit 54. Undissolved and spent waste gases that collect in the dome can also be vented to atmosphere as indicated through a restricted vent pipe 36'. The oxygenated mixed liquor 66 flows through the tank and from the lower part thereof at outlet 68 to an interstage conduit 70 and the inlet conduit 28' of the next reactor stage downstream.

Referring again to FIG. 2, it is seen that the mixed liquor in the final reactor stage 50 has been subjected to multiple stage treatment including periodic mixing and oxygen injection as in the system of FIG. 1. The recycling of the mixed liquor from the last stage of the reactor of FIG. 2 is essentially the same as for the pipeline reactor. The mixed liquor leaves the last reactor stage 50 in two streams, a major stream being recycled directly from the reactor tank through the conduit 24' to the receiving well 10, and a minor stream also being drawn off the tank through a conduit 25' to the clarifier 18. The clarifier stream is controlled by a valve 44' that is responsive to the liquid level indicator 41' in the well as described in FIG. 1. As the depleted and waste gas is vented from each reactor stage at 36', a final stage gas separator is not required as in FIG. 1.

In most cases a single pump between the well and first reactor stage is sufficient to maintain the mixed liquor in the reactor system under hyperbaric pressure for moving the liquor freely at required velocity through the respective stages. By proper location of the receiving well, the recycled mixed liquor from the reactor and the activated sludge from the clarifier can be directed to the well by gravity flow.

The advantages of this invention are best considered by comparing its application and that of a single-pass pipeline reactor to a typical wastewater treatment situation involving a plant with a nominal design capacity of 1.5 million gallons per day (MGD) of wastewater. Tests will be assumed showing that the desired BOD reduction can be obtained by adding 35 percent by volume of recycled activated sludge to the wastewater to form 2.02 MGD of mixed liquor (ML) reacting under aerobic conditions of 1.67 hours; also that measured oxygen requirement is 240 mg oxygen/liter ML and that a minimum velocity of 1 ft/sec. in the pipeline is required.

For the single-pass pipeline reactor, 2.02 MGD flow of ML corresponds to 3.15 cu.ft. per sec. flow. In order to maintain 1 ft/sec. flow velocity, the pipe cross-section must be 3.15 ft$^2$ which corresponds to a 24 inch diameter pipe. The required pipe volume is thus shown to be 18,880 cu.ft. requiring a 24 inch diameter pipe of 6013 ft. length.

For a constant flow situation all oxygen dissolution is assumed to occur in the pipeline static mixing devices, each device dissolving 20 mg/liter of oxygen on average, so that 12 static mixing devices are required.

Consider now, variations in the influent wastewater flow such as an hourly minimum of 0.5 MGD and an hourly maximum of 3 MGD; also that the flow of recycled activated sludge is maintained constant at its nominal value 0.52 MGD.

At minimum flow, the ML flow in the pipeline reactor is 1.02 MGD or 1.59 cu.ft./sec. In order to maintain the minimum 1 ft./sec/velocity under this condition, the pipe cross-section must be reduced to 1.59 ft$^2$ which corresponds to a 17 inch diameter pipe. However, to satisfy the requirement of 1.67 hr. treatment at nominal flow, i.e. to maintain 18,880 ft.$^3$ of reacting volume, the pipe length must be increased to 12,000 ft. At maximum flow, 3.52 MGD of ML, the treatment time is 0.96 hr. and the flow velocity is 3.5 ft/sec.

The present invention will be applied to the same situation. Instead of 24 inch diameter pipe, 42 inch diameter pipe with a 9.62 sq.ft. cross-section would be used, so that for the necessary 18,880 ft.$^3$ of reactor volume, the pipeline would be 1960 ft. long. The flow through the reactor will be 6.2 MGD or 259,000 gallons/hr to maintain the 1 ft./sec. velocity in the pipe. Since the influent wastewater and recycled activated sludge only amount to 84,400 gallons/hr. (2.03 MGD) at designed flow, the remainder of the liquid flowing through the pipeline reactor is supplied by recycling 174,600 gallons/hr. of ML from the reactor outlet to its inlet, i.e. receiving well. Thus, at nominal flow, 33 percent of the ML from the reactor is directed to the secondary clarifier and 67 percent is recycled to the reactor inlet. On average, each slug of mixed liquor passes 3.07 times through the reactor, the time for each pass being 0.54 hours or 33 min.

Based on current costs, the cost of the 42 inch diameter pipe reactor would be about half that for the 17 inch diameter pipe, each pipeline reactor having a total volume of 18,880 cu.ft.

The same total amount of oxygen must be dissolved as was dissolved in the single-pass pipeline reactor, but because of the average three passes through each of the static mixing devices, only one-third the number of static mixers are required. Although each mixer must have a three-fold increased capacity, the lesser number of discrete devices and associated control equipment offers substantial cost savings.

A minimum influent flow (1.02 MGD of ML), flow through the reactor would be maintained at 6.2 MGD by increasing the rate of ML recycle. At the reactor outlet, 16½ percent of the pipeline flow would be diverted to the secondary clarifier and 83½ percent would be recycled to the reactor inlet. Thus under the minimum flow condition the wastewater would pass through the reactor an average of six times.

At maximum flow peaks (3.52 MGD influent ML) only 43% of the ML would be recycled from the reactor outlet, the remaining 57 percent flowing to the clarifier. The wastewater would on average make 1.76 passes through the reactor, and the average treatment time would be, as in the single-pass reactor, 0.96 hours. As explained above, the adjustment of the ML recycle rating can be activated by a control system which simply adjusts ML recycle to maintain a constant level in the pump well.

Between the two systems, there is no significant difference in the work performed by the pump which forces ML through the reactor as the pump work depends on the product of the flow rate and the pressure drop. In the pipeline reactor, most of the pressure drop is created by the static mixing devices. Thus, even though the nominal flow of ML in this invention is increased by a factor of three, the number of static mixers, and therefore the pressure drop is reduced by a factor of three, as compared to the single-pass pipeline reactor. Moreover, the pumping system for the single-pass reactor is complicated by having to handle flows ranging from 1.02 to 3.52 MGD as the influent flow varies; whereas, in this invention, the pump operates at constant flow and pressure drop, and can therefore be designed for optimum mechanical efficiency.

The ML flow pattern in this invention embodies the chemical kinetic virtues of both a plug-flow reactor, of which the single-pass pipeline reactor is archetypical, and a completely mixed continuous flow reactor. Both plug-flow and mixed tank flow patterns have been used for the activated sludge process. In general, plug-flow reactors sometimes show a slightly faster reaction rate. On the other hand, because of the almost instantaneous dilution of the feedwater in continuous mixed reactors they are less susceptible to momentary BOD overloads or to momentary slugs of materials toxic to the activated sludge microbes. In practical continuous well mixed reactors, there is often difficulty in preventing hydraulic"short circuiting" i.e., the passage of wastewater directly from reactor inlet to outlet before complete mixing with the reactor contents. This does not occur in the invention since the wastewater is diluted by mixing before entrance to the pipeline, and even without mixing, the path to the reactor outlet requires, in this example, 0.54 hours to traverse.

Finally, as an example of this invention's improved tolerance for toxic materials, consider that for a transient five minute period the influent wastewater contains 6 mg/liter of phenol which after dilution only by recycled activated sludge, as in the single-pass systems, yields 4.4 mg/liter phenol in the ML, a concentration that if not lethal, ordinarily severely inhibits the action of the microbes in the activated sludge. In the example above at nominal flow, the ML recycle would immediately dilute the phenol concentration in the ML to 1.4 mg/liter, a concentration usually tolerable to the activated sludge microbes.

The term "oxygen" as used herein is intended to comprehend a suitable oxygen-enriched gas as well as commercially pure oxygen.

Having set forth the invention in which is considered to be the best embodiment thereof, it will be understood that changes may be made in the system and apparatus as above set forth without departing from the spirit of the invention or exceeding the scope thereof as defined in the following claims.

I claim:

1. A process for treating wastewater in an aerobic reactor having a series of closed reaction stages for passage therethrough of a mixed liquor of wastewater and activated sludge and a clarifier for normally receiving mixed liquor from the reactor and collecting activated sludge, the process comprising the steps of collecting the influent wastewater together with activated sludge in a receiving well as mixed liquor, pumping said mixed liquor from said well into said reactor under a positive pressure to establish a substantially constant flow rate of mixed liquor through said reactor and to impart sufficient turbulence to said mixed liquor to maintain activated sludge in suspension during passage of said mixed liquor through said reactor, injecting oxygen into the mixed liquor in respective reaction stages, dividing mixed liquor leaving the reactor into separate streams which are directed to the clarifier and recycled to the well with at least half of the mixed liquor leaving the reactor being normally recycled to the well and controlling the flow rate of the recycled stream according to the variation of the well liquid level from a predetermined reference level.

2. The process as specified in claim 1 wherein the step of controlling the flow rate of the recycled mixed liquor stream is effective to maintain a sufficient volume of mixed liquor in the well to enable the mixed liquor flow in said reactor to be maintained at said substantially constant flow rate.

3. The process as specified in claim 1 wherein the volumetric ratio of the recycled stream to that of the clarifier stream is increased for increasing detention time of mixed liquor in the reactor.

4. The process as specified in claim 1 wherein the mixture in the receiving well is subjected to mechanical stirring.

5. The process as specified in claim 1 wherein the detention time for each passage of mixed liquor through the reactor stages does not exceed half of that required for desired overall BOD reduction, as determined by the number of recycled passes of mixed liquor.

6. A system for treating wastewater comprising an aerobic reactor having a series of closed reaction stages for passage therethrough of a mixed liquor including wastewater and recycled activated sludge, a clarifier for receiving mixed liquor from the reactor and collecting activated sludge, a receiving well for collecting the influent wastewater and recycled activated sludge from the clarifier, means for drawing the mixture from the well as mixed liquor and passing said removed mixed liquor through said reactor under hyperbaric pressure at a substantially constant flow rate whereby sufficient turbulence is imparted to said mixed liquor to maintain activated sludge in suspension during the passage of mixed liquor through said reactor, means for injecting oxygen into the mixed liquor in respective reaction stages, means for sensing the level of mixed liquor in said well, and means for dividing the mixed liquor leaving the reactor into separate streams and recycling to the well one stream of the mixed liquor leaving the reactor, said dividing means being responsive to said sensing means to regulate the flow rate of recycled mixed liquor in accordance with the flow rate of said influent wastewater whereby an adequate volume of said mixed liquor is maintained in said well to enable said mixed liquor to be drawn therefrom at said constant flow rate.

7. A system as specified in claim 6 wherein the dividing means constitutes valve means responsive to variations in the well liquid level for controlling flow of the recycling stream.

8. A system as specified in claim 6 wherein said means for drawing said mixture from said well comprise pump means for moving the mixed liquor from the well and through the reactor at a substantially constant flow velocity.

9. A system as specified in claim 6 wherein the receiving well is provided with a liquor stirring device.

10. A system as specified in claim 6 wherein the aerobic reactor constitutes a sectionalized pipeline for defining closed reaction stages and the mixed liquor from the last stage of the reactor passes through a gas separator to the stream dividing means.

11. A system as specified in claim 10 wherein the stream dividing means constitutes a branched conduit, one branch leading directly to the receiving well and the other branch to the clarifier, and the clarifier branch is controlled by a valve that is controlled by a liquid level sensing device in the receiving well.

12. A system as specified in claim 6 wherein each reaction stage constitutes a closed receptacle having oxygen injection means integrated with the means for directing influent mixed liquor to the receptacle.

13. A system as specified in claim 6 wherein said aerobic reactor is comprised of a series of closed reaction stages of the completely mixed continuous reactor type, each of said stages is comprised of a static mixing device including gravitational fall zone means wherein said mixed liquor is caused to undergo a free fall from a first to a second level; and said means for injecting oxygen are effective to establish a gas space in each of said stages at said fall zone means, such that upon said mixed liquor falling through each of said gas spaces a high degree of liquid gas turbulence is created thereby effecting a mass transfer of oxygen into said mixed liquor.

14. A system as specified in claim 8 wherein said substantially constant flow velocity is at least 0.5 ft./sec.

* * * * *